Aug. 30, 1966 M. C. VANIK ETAL 3,270,309
TEMPERATURE SENSITIVE DEVICE
Filed Jan. 29, 1964
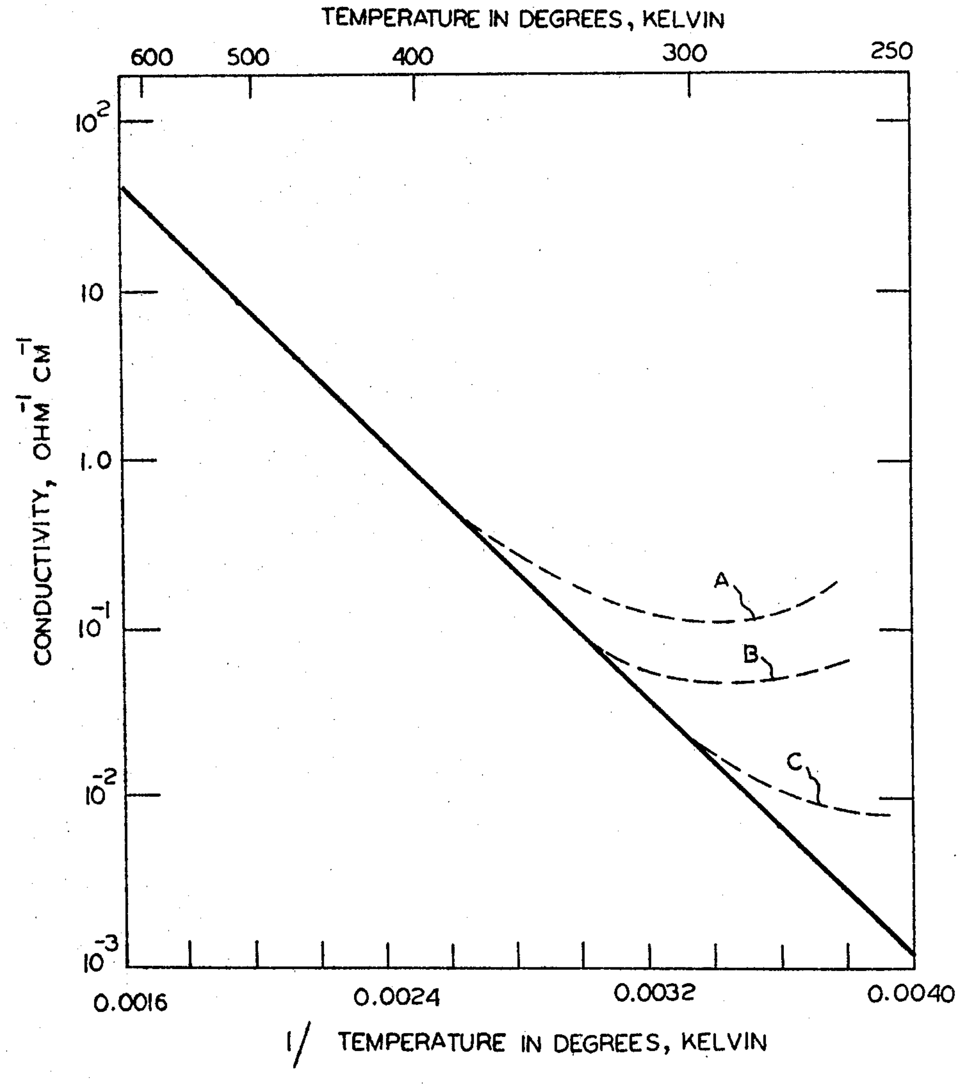
INVENTOR
M. C. VANIK
M. G. SANCHEZ
J. E. HERRERA
BY Joseph P. Nixon
ATTORNEY United States Patent Office 3,270,309

Patented August 30, 1966

3,270,309

TEMPERATURE SENSITIVE DEVICE

Milton C. Vanik, Brookville, Moises G. Sanchez, Severna Park, and Jose E. Herrera, Jessup, Md., assignors to W. R. Grace & Co., New York, N.Y., a corporation of Connecticut Filed Jan. 29, 1964, Ser. No. 341,077

6 Claims. (Cl. 338—22)

This invention relates to thermistors prepared from single crystal germanium. In some specific aspects, it relates to germanium thermistors used in microwave power measuring equipment, gas phase chromatographs, vacuum gauges and any other equipment based on the dissipation of energy from a heated thermistor.

Germanium is a semi-conductor material whose low temperature conductivity is highly dependent on the number and kind of impurities present. The conductivity of germanium at high temperatures is an intrinsic property of the material itself. The figure shows a plot of the conductivity of several samples of germanium (A, B, C) containing varying amounts of impurities, against temperature. Every curve in the plot exhibits two distinct parts. At low temperatures, the conductivity varies little with temperature. At high temperatures, the conductivity varies markedly with temperature and all the curves converge to a common one. The low temperature section is often called the extrinsic conductivity range, because the conductivity is mainly controlled by the number of foreign impurities present in the germanium. Curve B gives the conductivity of a sample of germanium containing approximately 4 parts per billion of P-type impurities. Curve C gives the conductivity of a sample of germanium of higher purity than B. Curve A gives the conductivity of a sample containing more impurities. The same relationship holds true for N-type germanium.

The high temperature portion of the curve is called the intrinsic range of conductivity since it is characteristic of germanium regardless of the impurities present. The high response of conductivity to temperature, in the intrinsic range of germanium, is the basis for the operation of our thermistors. In the intrinsic range represented by the solid line, the conductivity very closely follows Equation 1

$$C=C_0 l^{\frac{-\Delta\epsilon}{2KT}} \qquad \text{Equation 1}$$

Where $C$=the conductivity in mhos per centimeter at temperature T $C_0$=a constant characteristic of germanium in mhos per cm.

$\Delta\epsilon$=the energy gap of germanium expressed in electron volts $K$=Boltzmann's constant in electron volts per degree Kelvin $T$=the absolute temperature in degrees Kelvin The term $$\frac{\Delta\epsilon}{2}$$

is often represented by E which is called the activation energy of conductivity. Therefore Equation 1 can be written as:

$$C=C_0 l^{\frac{-E}{KT}} \qquad \text{Equation 2}$$

Since the resistivity is defined as the reciprocal of the conductivity, Equation 1 may be written as:

$$\rho=\rho_0 e^{\frac{E}{KT}} \qquad \text{Equation 3}$$

Where $\rho$=the resistivity in ohm-centimeters at a temperature T in degrees Kelvin $\rho_0$=a constant in ohms centimeters which is characteristic of germanium $$\left(\rho=\frac{1}{C_0}\right)$$

$E$=the activation energy of conductivity expressed in electron volts $K$=Boltzmann's constant in electron volts per degree Kelvin Differentiation of this equation gives:

$$d\rho=-\frac{\rho E}{KT^2}dT \qquad \text{Equation 4}$$

from which one gets $$\frac{1}{\rho}\frac{d\rho}{dT}=-\frac{E}{KT^2} \qquad \text{Equation 5}$$

The left hand side of this equation represents the relative change in resistivity per unit change of temperature which is the temperature coefficient of resistivity. This parameter is often designated by the letter alpha ($\alpha$); mathematically it is given by:

$$\alpha=-\frac{E}{KT^2} \qquad \text{Equation 6}$$

Equation 6 indicates that the temperature coefficient of resistivity in semi-conductors is proportional to the activation energy and inversely proportional to the square of the absolute temperature. For any given temperature, $\alpha$ is determined by the value of E. To express the value of $\alpha$ as a function of E, one can substitute K for its value in electron volts per degree Kelvin ($8.61\times10^{-5}$) and T for the desired temperature in degrees Kelvin. For instance, at 160° C. which corresponds to 433° K. one gets:

$$\alpha=-0.0620E \qquad \text{Equation 7}$$

Present thermistors are made from ceramic oxides, such as nickel oxide, iron oxide, cobalt oxide, etc., or mixtures thereof. They are made of polycrystalline aggregates in which the individual particles are bound to each other in an irregular and often non-reproducible manner. The particle or grain structure of these aggregates change with time so that ceramic thermistors change in properties with time. They are not stable, particularly upon frequent temperature changes or cycling. The thermistors of our invention, on the other hand, are made of single crystalline germanium, an article of commerce well known for its uses in high precision electronic devices. Because our thermistors are made of single crystalline germanium, they are not subject to these limitations and do not exhibit these undesirable characteristics. Germanium thermistors show very little or no change in properties during aging or cycling.

As shown in Equation 6, the sensitivity of thermistors is dependent upon E the activation energy of conductivity. For ceramic thermistors, E is in the range of 0.2 to 0.3 electron volt. In our thermistors, E is substantially higher making them more sensitive to temperature than the conventional ceramic thermistors.

The resistance of a thermistor will not only depend on the resistivity of the material of construction, but also on the shape and dimensions of the device itself. For devices of constant cross-section, the resistance is given by the following equation:

$$R=\rho\frac{l}{S} \qquad \text{Equation 8}$$

Where $R$=the resistance in ohms
$\rho$=the resistivity in ohm-centimeters
$l$=the length in centimeters
$S$=the cross-sectional area in square centimeters Equation 8 clearly shows that the resistance R of a thermistor is proportional to the resistivity of the germanium. Combining Equation 8 with Equation 3 gives:

$$R = R_0 l^{\frac{E}{KT}} \qquad \text{Equation 9}$$

Where $R$=the resistance of the thermistor in ohms
$R_0$=a constant in ohms (a function of the resistivity and the shape)
$E, K, T$=as defined in Equation 3

In preparing high precision thermistors, care must be given to sizing the devices to exact dimensions. In the case of single crystalline germanium, sizing can be obtained by precise cutting with a diamond saw or ultrasonic dicer. These operations are standard procedure in the electronics industry. In this manner, it is possible to combine the excellent reproducibility of single crystalline germanium with the ability to precisely control size to achieve excellent thermistor characteristics. In general, the ratio $l/S$, in Equation 8, can be reproduced from unit to unit within $\pm 1\%$. In very small devices, this reproducibility is more difficult to achieve by standard techniques. In cases where very high precision is needed, the exact value of $l/S$ can be obtained by controlled etching of the germanium. Several techniques may be used for this. For example, electrolytic etching in NaOH solutions affords a very convenient method of size adjustment. In this method the amount of material etched away depends upon the amount of current used. Hence, the amount etched can be controlled very precisely by a simple control of current and time. Furthermore, the method is amenable to automation.

A very important requirement in a thermistor, which is a two terminal electric device, is to achieve a good electrical contact between the semi-conductor body and the metallic leads. By good electrical contact we mean, a contact whose electrical resistance is negligible with respect to the resistance of the device over its entire temperature range of operation and one which is non-rectifying. Besides these electrical requirements, the contact should be mechanically strong and thermally stable.

Good contacts can be made by several techniques. For instance, the germanium surface may be plated with a metal such as nickel which gives a non-rectifying contact. Leads to the plated metal can be made by thermal compression bonding or soldering.

Another method which gives excellent electrical contacts coupled with excellent mechanical strength is the alloying technique. In this method metal leads such as gold wire are bonded by thermal compression to the clean germanium surface. The bond is then alloyed under carefully controlled conditions near the eutectic temperature of the germanium-metal systems. During this treatment inter-diffusion of the materials takes place forming the alloyed contact.

There are other methods and variations which can be also used provided that the resulting contacts are mechanically strong and electrically ohmic or non-rectifying of negligible resistance.

The germanium thermistors of our invention have several advantages. The properties are based on the intrinsic conductivity of germanium which is a fundamental property and thus not subject to change. We can exercise excellent control over the resistance of the device by sizing techniques and can attach good electrical and mechanical contacts.

Our devices are particularly suited for specific applications where the power dissipation from an electrically heated thermistor is the key to performance. For instance, in microwave power measuring equipment, gas phase chromatographs and vacuum gauges.

In these applications, thermistors are maintained at a temperature higher than the ambient by passing an electric current through them, often referred to as a bias current. In the case of vapor phase chromatographs a pair of thermistors are located in adjoining compartments kept at the same temperature. The carrier gas flows through one of the compartments and then after picking up the partitioned unknown samples it flows through the other compartment. The difference in thermal conductivity between the carrier gas and the gas mixtures results in different power dissipation from the thermistors, hence different temperatures and resistances. The unbalance of the thermistor pair is amplified and measured. In this application it is essential to have matched thermistor pairs. Good performance over extended periods of time requires that these thermistors remain closely matched. Present oxide thermistors tend to change in properties with time and often become unmatched. This is a serious limitation which the thermistors of the instant invention do not possess.

In microwave power measurements a thermistor is placed in one arm of a bridge and a known bias current is passed to heat the thermistor above the ambient temperature. The bridge is balanced under these steady state conditions of power dissipation. The microwave beam to be measured is guided on to the thermistor. The microwave power couples with the thermistor which is heated above its steady state temperature. The bias current is decreased to rebalance the bridge. The decrease in bias power corresponds to the microwave power. In some measurements a refinement is introduced by having a second bridge with a thermistor mounted very close to the primary bridge thermistor, but shielded from the microwave beam. The purpose of this second thermistor bridge is to correct for ambient temperature fluctuations. Since both thermistors are in identical thermal surroundings, fluctuations of ambient temperature will affect both equally. Both will respond in the same manner provided they are closely matched and remain so throughout their life.

In the microwave power measurement described above matching between thermistors in the following properties is essential: resistance, resistance to temperature response, thermal conductivity and dielectric constant. Present oxide thermistors vary in properties from unit to unit because of changes in composition, porosity, grain size and interparticle contacts. Their use is consequently limited. The thermistors of the instant invention exhibit constant characteristics in all these properties because they are made of single crystalline, high-purity germanium.

From all this, it can be seen that our ability to control power dissipation from unit to unit is beyond the present state of the art.

If needed, the dissipation characteristics of our thermistors can be changed through the use of a coating which is non-conductive, thermally stable and adhesive to the germanium. This coating could be a paint based on silicone or on epoxy resins, or an inorganic material such as glass.

Other reasons for the superior performance of our thermistors in power dissipation applications are their excellent thermal stability, high sensitivity at high temperatures and low resistance at lower temperatures.

The combination of high sensitivity and low relative resistance at low temperatures is possible in our thermistors because of the two kinds of conductivity of germanium. In the intrinsic region, the resistance response to temperature is high, hence the devices exhibit very good sensitivity. At low temperatures, however, the extrinsic conductivity dominates the picture preventing a drastic increase in resistance. By choice of the proper impurity level in the starting germanium, we can control the temperature range at which the resistance tends to level. Ordinary thermistors of equal sensitivity do not level off and as the temperature goes down, their resistance goes up to very high values. This characteristic places many limitations on the uses of ordinary thermistors.

Our invention is further illustrated by the following specific but non-limiting examples:

*Example I*

This example illustrates a general method of preparing single crystal germanium thermistors.

A wafer of monocrystalline germanium was purchased from a commercial supplier. The nominal resistivity of the wafer at 25° C. was 20 ohm-centimeters P-type and the wafer had the characteristic trapezoidal shape of commercial monocrystalline germanium. It was about 2 cm. across and 1 mm. thick.

The wafer was hand lapped in one direction with 180 C. silicon carbide paper. It was then washed with water and wiped with paper to remove fine particles. Successive washings with methanol, acetone and methanol then followed. The wafer was further treated with 10% hydrofluoric acid. Then the wafer was treated with a 10% sodium hydroxide solution and transferred rapidly to an electrodless nickel-plating solution heated to about 96° C. The solution had the following formulation:

| | G./liter |
|---|---|
| Nickelous chloride | 30 |
| Sodium hypophosphite | 10 |
| Sodium citrate | 65 |
| Ammonium chloride | 50 |

The solution was adjusted to a pH of 7 by the addition of ammonium hydroxide.

The pH was maintained at about 7 during the plating procedure which lasted about 3 minutes. During this time approximately 0.1 g. of nickel was plated on the wafer. The plated wafer was washed, dried and then heated at 210° C. overnight in a helium (He) atmosphere.

The wafer was mounted on a ceramic block with a shellac base wax. It was then crosscut on a diamond saw to produce squares 0.3 cm. on a side. The final thermistor dice measured 0.3 cm. x 0.3 cm. x 0.1 cm. and were nickel plated on the 0.3 x 0.3 cm. faces. The dice were separated from the block by dissolving the wax with methanol. The dice were further cleaned with methanol.

Leads were soldered to the dice with tin: The thermistor dice were mounted in a Teflon jig and silver plated copper leads butted against the nickel plated surfaces. Flux was applied on the plated surfaces. The jig and thermistor were dipped into a tin pot, heated to a temperature of 240–250° C. The thermistor was held in the tin just long enough for the tin to wet the plated surfaces and the leads. After the soldering step, the devices were washed with methanol.

*Example II*

This example illustrates the preparation of another type of thermistor.

In this preparation, a wafer of commercial germanium measuring 20 ohm-cm. P-type and 0.040" thick was plated with nickel as described in Example I. It was then cemented to a ceramic block and cross cut on a precision diamond saw to produce parallelepiped dice measuring 0.020" x 0.020" x 0.040". The dice were separated from the block by dissolving the wax with methanol. The dice were further cleaned with methanol. In this device, the plating was on the two square faces measuring 0.020" x 0.020". Gold leads 0.003" in diameter were attached to the nickel plated faces using an Electroglas SP–2 thermal compression bonding machine. This machine is a commercially available thermal compression bonding machine.

*Example III*

This example illustrates a general method of preparation of micro-thermistors.

In this preparation a 20 ohm-cm. P-type germanium wafer was purchased from a commercial supplier. The wafer was of the same size and shape as the wafer described in Example I, except it was 0.020" thick. In the first step of the preparation, the wafer was cemented to a ceramic block with a shellac base wax and diced into squares 0.008" x 0.008" using a precision diamond saw. The final size of the thermistor dice was 0.008" x 0.008" x 0.020".

The dice were separated from the ceramic block by dissolution of the shellac in methanol. They were further cleaned in a methanol bath, and then treated with hydrogen peroxide in dilute ammonium hydroxide. A methanol cleaning followed.

Gold wire, 0.001" in diameter, was attached by thermal compression bonding to the two 0.008" x 0.008" faces. This operation was repeated for other dice from the same wafer. The dice after thermal compression bonding were washed with methanol and mounted in a furnace where they were alloyed for approximately 5 minutes at 380° C.

In an alternate procedure, the dice were alloyed by placing them on a hot block at 440° C. and viewing them under a stereo microscope until the gold-germanium interface heated to the eutectic temperature (356° C.). At this point, a liquidus formed, interpenetration of the metals occurred, and the leads relaxed. The thermistors were quickly removed from the heat to prevent too much interpenetration which results in an unstable contact.

*Example IV*

This example illustrates a method of preparing a P-type germanium thermistor.

A 1 mm. thick wafer of P-type germanium measuring 20 ohm-cm. was prepared for plating as described in Example I except the ammonium hydroxide treatment was omitted. It was then immersed in a gold plating solution of the following composition:

| | G. |
|---|---|
| C.T.C. gold plating solution (Sigmund Cohen Manufacturing Co.) | 100 |
| Deionized water | 100 |
| Potassium fluoride | 100 |

The plating solution was heated to 90° C. Nitric acid was added until plating began. The plating lasted for about 4 mins. and about 0.12 gram of gold was deposited on the wafer. The wafer was washed with deionized water and allowed to dry.

Dice measuring 0.020" x 0.020" x 0.040" were prepared by diamond saw cutting as described in Example II. The two 0.020" x 0.020" faces were gold plated. Gold leads 0.003" in diameter were attached to the gold plated faces using the thermal compression bonding equipment of Example II.

*Example V*

This example illustrates an alternate method of preparing a P-type thermistor.

A wafer of P-type germanium one mm. thick was hand lapped in one direction with 180 C. silicon carbide paper. It was then washed with water, and wiped with paper to remove fine particles. Successive washings with methonal, acetone and methanol followed.

The wafer was mounted in the vacuum chamber of a commercial (Kinney) vacuum float zone refining unit above a densified graphite crucible containing high purity silver. The pressure in the chamber was reduced to $8\times10^{-5}$ mm. Hg. A radio frequency field supplied energy to heat the silver. Each side of the wafer was deposited with silver by heating the silver to about 1500° C. for 30 seconds.

Dice measuring 0.020" x 0.020" x 0.040" were prepared by diamond saw cutting as described in Example II. The two 0.020" x 0.020" faces were silver deposited. Gold leads 0.003" in diameter were attached to the silver deposited faces using the thermal compression bonding equipment of Example II.

*Example VI*

This example illustrates the preparation of another type thermistor. A 1 mm. thick wafer of P-type germanium measuring 20 ohm cm. was cemented to a ceramic block with a shellac based wax and diced into squares 0.020" x 0.020" with a precision diamond saw. The dice were separated from the block as described in Example II. Gold leads 0.003" in diameter were attached by thermal compression bonding to the 0.020" x 0.020" faces of the 0.020" x 0.020" x 0.040" thermistor elements.

*Example VII*

This example illustrates an alternate method of preparing germanium thermistors. In this preparation thermistors as prepared by the methods in Examples I through VI are further finished by coating them with a protective and high resistance film. The finish is a paint based on silicone or epoxy resins. The finish is applied by dipping, spraying or hand finishing and is baked at a temperature high enough to set the coating.

*Example VIII*

This example illustrates an electrolytic method of size adjustment used in preparing our thermistors.

Two thermistors prepared as in Example III were etched electrolytically to obtain a resistance of 100 ohms±1%. Prior to adjustment the thermistors measured 80.1 ohms and 88.5 ohms at 160.0° C. The first thermistor was immersed in a solution of 2% sodium hydroxide. A 0.005" platinum-iridium electrode (containing 10% iridium) was placed about 3 mm. from the side of the thermistor. A D.C. voltage was established between the thermistor (anode) and the platinum-iridium electrode (cathode). During the etching the current was maintained at 60 microamps. A glass shield protected the leads and contacts of the thermistor. The resistance of the thermistor was measured periodically. In 4 minutes the resistance was 88.1 ohms, in 6 minutes 95.0 ohms, and in 7½ minutes 99.2 ohms.

The second thermistor was adjusted following the same procedure. The initial resistance of 88.5 ohms increased to 96.4 ohms in 3 minutes. In 5 minutes the resistance was 100.3 ohms.

*Example IX*

This example illustrates a general mechanical method of size adjustment. A thermistor prepared as in Example VI is mounted on a terminal board near a standard thermistor of the proper resistance. The terminal board is then submerged below the surface of a silicone oil bath to equilibrate both thermistors at the same temperature. The adjustment is made by comparing the resistance of the thermistor being adjusted to the resistance of the standard thermistor. The thermistors are mounted in opposite arms of a Wheatstone bridge. Precise temperature control of the oil bath is not necessary. In this case, it is maintained at about 100° C. Germanium is abraded mechanically from the sides of the thermistor until the resistance increases to the desired level.

*Example X*

This example illustrates the high sensitivity of the single crystal germanium thermistors.

The resistance of a micro-thermistor, prepared as in Example III, was measured between 100 and 200° C.

The results were as follows:

| Temperature: | Resistance, ohms |
|---|---|
| 100.0° C. | 477.0 |
| 119.9° C. | 262.0 |
| 140.0° C. | 145.6 |
| 159.9° C. | 90.1 |
| 180.1° C. | 55.8 |
| 200.2° C. | 36.8 |

The resistance closely followed Equation 9 in the measured range. A plot of the logarithm of the resistance against the reciprocal of the absolute temperature gave a straight line whose slope corresponded to 0.39 electron volt. From this value and using Equation 6 we calculated the temperature coefficients of resistance ($\alpha$). Results were as follows:

| Temperature, ° C.: | Temperature coefficient resistance, $\alpha$ (percent/C., percent |
|---|---|
| 100 | 3.4 |
| 120 | 2.9 |
| 140 | 2.7 |
| 160 | 2.4 |
| 180 | 2.2 |
| 200 | 2.0 |

As can be seen, the thermistor exhibited a high temperature response (over 2% per degree centigrade) over the entire temperature range. This high temperature response is characteristic of high sensitivity.

*Example XI*

This example describes the shape of the intrinsic and extrinsic branches of the resistance vs. temperature curve set out in the figure and the low temperature leveling effect. The resistance of a thermistor prepared as in Example VI was measured from 0 to 200° C. The results are tabulated below:

| Temperature in ° C.: | Measured resistance in ohms |
|---|---|
| 0.0 | 835.4 |
| 25.0 | 934.4 |
| 60.0 | 502.3 |
| 80.0 | 241.4 |
| 99.9 | 126.7 |
| 120.0 | 68.9 |
| 140.0 | 39.5 |
| 160.0 | 24.1 |
| 180.0 | 15.9 |
| 200.0 | 10.4 |

In the 100–200° C. range the resistance R closely follows the Equation 9 on page 4. In this range, a plot of the logarithm of the resistance against the reciprocal of the absolute temperature gives a straight line. Below 100° C. the resistance deviates from the straight line. The plot curves downward as the resistance tends to level off. It goes through a maximum between 60 and 0° C. The straight portion of the curve is called the intrinsic conductivity range. The low temperature portion which is none linear is called the extrinsic conductivity range. A transition region lies between the two zones.

*Example XII*

This example illustrates a measurement of the power dissipation characteristics of a thermistor.

A micro-thermistor prepared as in Example III was mounted in the center of a 12 mm. inside diameter test tube which was immersed in a 60° C. water bath. The air ambient of the thermistor was at 60° C. The thermistor was heated using a bias current until its temperature reached 160° C. At this point, the bias current measured 14.9 milliamps and the resistance of the thermistor was 92.8 ohms. From these data, the power required to heat the thermistor from 60° to 160° C. in air was calculated to be 20.6 milliwatts.

*Example XIII*

This example illustrates the non-rectifying nature of the contacts of the germanium thermistors.

Several micro-thermistors prepared as in Example III were measured with opposite polarities on a Wheatstone bridge at 200° C. and 50 microamps current. The results are tabulated below:

| Sample No. | Resistance in ohms (200.7° C.) | |
|---|---|---|
| | + Polarity | − Polarity |
| 1 | 39.6 | 39.6 |
| 2 | 40.3 | 40.3 |
| 3 | 40.2 | 40.2 |

As the data shows, the resistance of the germanium thermistors did not change with polarity.

*Example XIV*

This example illustrates the ability to make thermistors with matched properties by the described techniques.

Two micro-thermistors prepared as in Example III were measured at 60°, 100° C. and 160° C.

| Thermistor No. | Resistance in ohms at— | | |
|---|---|---|---|
| | 60° C. | 100° C. | 160° C. |
| 1 | 2311.2 | 508.0 | 92.8 |
| 2 | 2324.0 | 512.0 | 94.4 |

The ratio of the 100° C. reading to the 160° C. reading, *R* 100° C./*R* 160° C., is 5.48 for thermistor No. 1 and 5.44 for No. 2. The ratio *R* 60° C./*R* 100° C. for No. 1 is 4.55, and for No. 2 is also 4.55. The power dissipation was measured as described in Example XII. In the case of thermistor No. 1, the 60–160° C. power dissipation was 20.6 milliwatts. In the case of thermistor No. 2, the 60–160° C. dissipation was 20.8 milliwatts.

Obviously, many modifications and variations of the invention may be made without departing from the essence and scope thereof and only such limitations should be applied as are indicated in the appended claims.

What is claimed is:

1. A stable temperature sensitive device consisting of a single crystal of high purity germanium exhibiting an absolute resistivity response to temperature of at least two percent per degree at 160° C. and operable in the temperature range of 60 to 300° C., said crystal having two gold leads alloyed with said germanium body.

2. A device according to claim 1 wherein the germanium has a resistivity of 1 to 70 ohm centimeters at 25° C.

3. A stable device according to claim 1 wherein the germanium has a resistivity of 1 to 70 ohm-centimeters at 25° C., said device exhibiting an absolute resistivity response to temperature of at least two percent per degree at 160° C.

4. A microthermistor comprising a single crystal germanium having a ratio of surface cross sectional area to length of from 0.1 to 0.001 said device having gold wire leads alloyed into the germanium and exhibiting an average dissipation constant of from 0.01 to 1.0 milliwatt per degree centigrade, said device exhibiting a resistance at 25° C. of less than 100 times the resistance at 160° C.

5. A microthermistor for use in microwave power measurement comprising a single crystal of germanium and having a ratio of surface cross sectional area to length of 0.05 to 0.005, said device having thin wire leads attached to the germanium body through ohmic contacts exhibiting an average dissipation constant of from 0.01 to 1 milliwatt per degree centigrade, said device exhibiting a resistance at 25° C. of less than 100 times the resistance at 160° C.

6. A microthermistor for use in vapor phase chromatography comprising a single crystal of germanium and having a ratio of surface cross sectional area to length of from 0.05 to 0.005, said device having thin wire leads attached to the germanium body through ohmic contacts exhibiting an average dissipation constant of from 0.05 to 0.5 milliwatt per degree centigrade, said device exhibiting a resistance at 25° C. of less than 100 times the resistance at 160° C.

References Cited by the Examiner

UNITED STATES PATENTS

| | | | |
|---|---|---|---|
| 2,373,160 | 4/1945 | Bollman et al. | 338—22 |
| 2,629,166 | 2/1953 | Marsten et al. | 29—155.69 |
| 2,860,218 | 11/1958 | Dunlap | 338—25 X |
| 2,871,427 | 1/1959 | Tyler et al. | 338—25 X |
| 2,953,759 | 9/1960 | Lehovec | 338—8 |
| 2,977,558 | 3/1961 | Hampton | 338—22 |
| 3,021,433 | 2/1962 | Morrison | 338—25 X |
| 3,030,189 | 4/1962 | Schweickert et al. | 252—62.3 X |
| 3,036,368 | 5/1962 | Felts | 29—155.69 |
| 3,089,108 | 5/1963 | Gong et al. | 338—2 |
| 3,181,097 | 4/1965 | Lehovec | 338—22 |
| 3,186,835 | 6/1965 | Bundy | 252—62.3 X |

RICHARD M. WOOD, *Primary Examiner.*

H. T. POWELL, W. D. BROOKS, *Assistant Examiners.*

UNITED STATES PATENT OFFICE
CERTIFICATE OF CORRECTION

Patent No. 3,270,309 August 30, 1966

Milton C. Vanik et al.

It is hereby certified that error appears in the above numbered patent requiring correction and that the said Letters Patent should read as corrected below.

Column 1, line 45, equation 1 should appear as shown below instead of as in the patent:

$$C=C_o e^{\frac{-\Delta\varepsilon}{2KT}}$$

line 65, equation 2, should appear as shown below instead of as in the patent:

$$C=C_o e^{\frac{-E}{KT}}$$

column 2, line 8, the equation should appear as shown below instead of as in the patent:

$$(\rho=\frac{1}{C_o})$$

column 3, line 11, equation 9, should appear as shown below instead of as in the patent:

$$R=R_o e^{\frac{E}{KT}}$$

Signed and sealed this 5th day of September 1967.

(SEAL)
Attest:

ERNEST W. SWIDER
Attesting Officer

EDWARD J. BRENNER
Commissioner of Patents